Nov. 25, 1969 P. HONCHARENKO 3,479,982
SUDDEN STOP ACTUATED VEHICLE WARNING SIGNAL
Filed Aug. 29, 1967 2 Sheets-Sheet 1
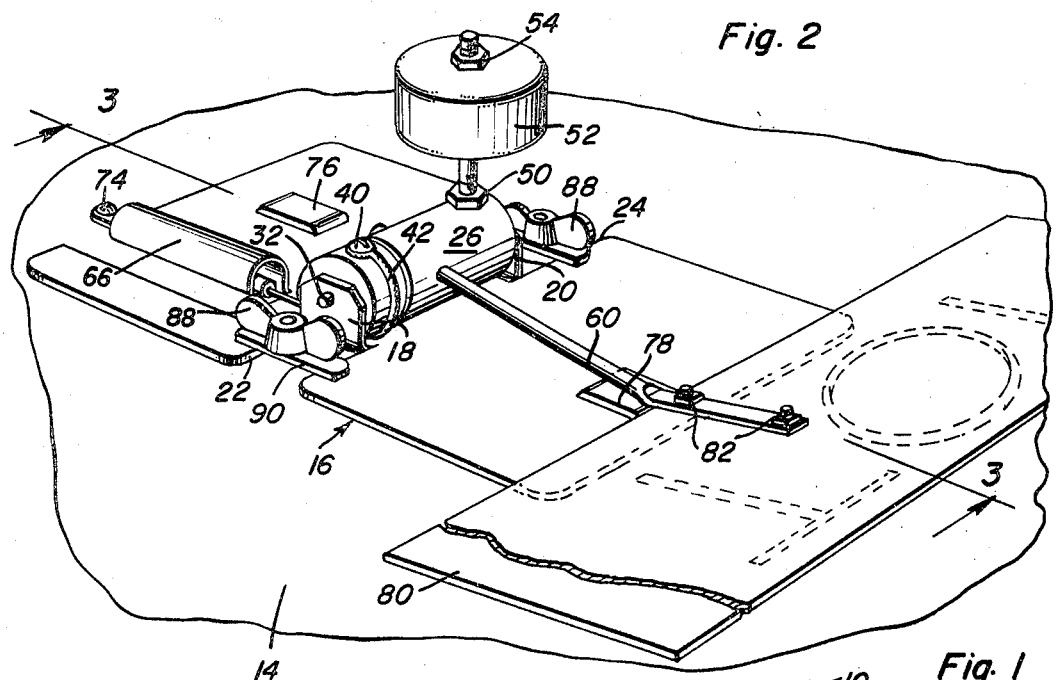
Fig. 2
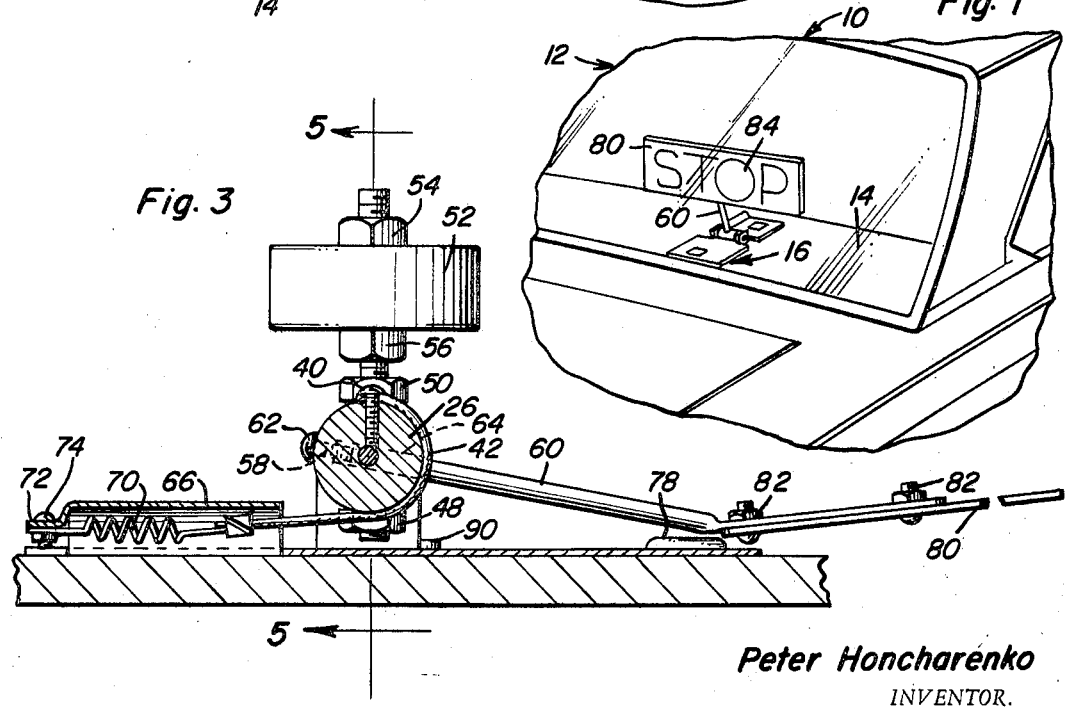
Fig. 1
Fig. 3
Peter Honcharenko
INVENTOR.

Nov. 25, 1969  P. HONCHARENKO  3,479,982
SUDDEN STOP ACTUATED VEHICLE WARNING SIGNAL
Filed Aug. 29, 1967  2 Sheets-Sheet 2

Peter Honcharenko
INVENTOR.

BY Clarence A. O'Brien
and Harvey B. Jacobson
Attorneys

United States Patent Office 3,479,982
Patented Nov. 25, 1969

3,479,982
SUDDEN STOP ACTUATED VEHICLE
WARNING SIGNAL
Peter Honcharenko, 37793 W. Horseshoe Drive,
Mount Clemens, Mich. 48043
Filed Aug. 29, 1967, Ser. No. 664,177
Int. Cl. B60q 1/26
U.S. Cl. 116—35                      10 Claims

ABSTRACT OF THE DISCLOSURE

A warning device including a base adapted to be supported from a vehicle subject to sudden deceleration and having a signal actuating arm pivotally secured thereto for swinging movement between active and inactive positions rotated between 45° and 135° apart about an axis extending transversely of the arm with spring means operatively connected between the base and the arm yieldingly urging the arm toward its inactive position and weight means supported from the base for oscillation generally in unison with the arm and operative, upon deceleration of the base while moving in at least one direction, to shift the arm toward its active position.

---

The warning signal of the instant invention is primarily adapted for use on motor vehicles and particularly motor vehicles having rear windows disposed reasonably close to the rear end of the vehicle and having a generally unused portion of the interior of the vehicle disposed immediately inwardly thereof.

The warning signal of the instant invention is not dependent upon any source of power for its operation although it may be electrified so as to illuminate portions thereof when the signal is actuated.

Deactuation of the signal is entirely in response to sudden deceleration of the vehicle in which the signal is disposed and the signal is of the automatic resetting type wherein its repeated operation will be completely automatic.

The main object of this invention is to provide a warning signal which will be viewable through the rear window of a vehicle by drivers of trailing vehicles and which may be automatically actuated upon deceleration of the vehicle in which the signal is disposed at a rate above a predetermined rate.

Another object of this invention is to provide a sudden deceleration warning signal which will be operative completely independently of a power source other than inertia generated by sudden deceleration of the associated vehicle in which the signal is disposed.

Yet another object of this invention is to provide a warning signal including a flag portion thereof which is automatically raised from a hidden position to a position readily viewable by the driver of a vehicle trailing the vehicle in which the signal is disposed upon sudden deceleration of the vehicle in which the vehicle is mounted.

Another object of this invention, in accordance with the immediately preceding object, is to provide a warning signal having a flat portion thereof which may be readily electrified so as to be automatically illuminated upon the flag portion of the signal being moved to its raised operative position.

A final object of this invention to be specifically enumerated herein is to provide a warning signal in accordance with the preceding objects which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a rear portion of a conventional passenger vehicle in which the warning signal of the instant invention has been mounted just forwardly of the rear window of the passenger vehicle;

FIGURE 2 is a fragmentary perspective view of the warning signal in its inactive position;

FIGURE 3 is a fragmentary sectional view taken substantially upon the plane indicated by section line 3—3 of FIGURE 2;

Figure 4:
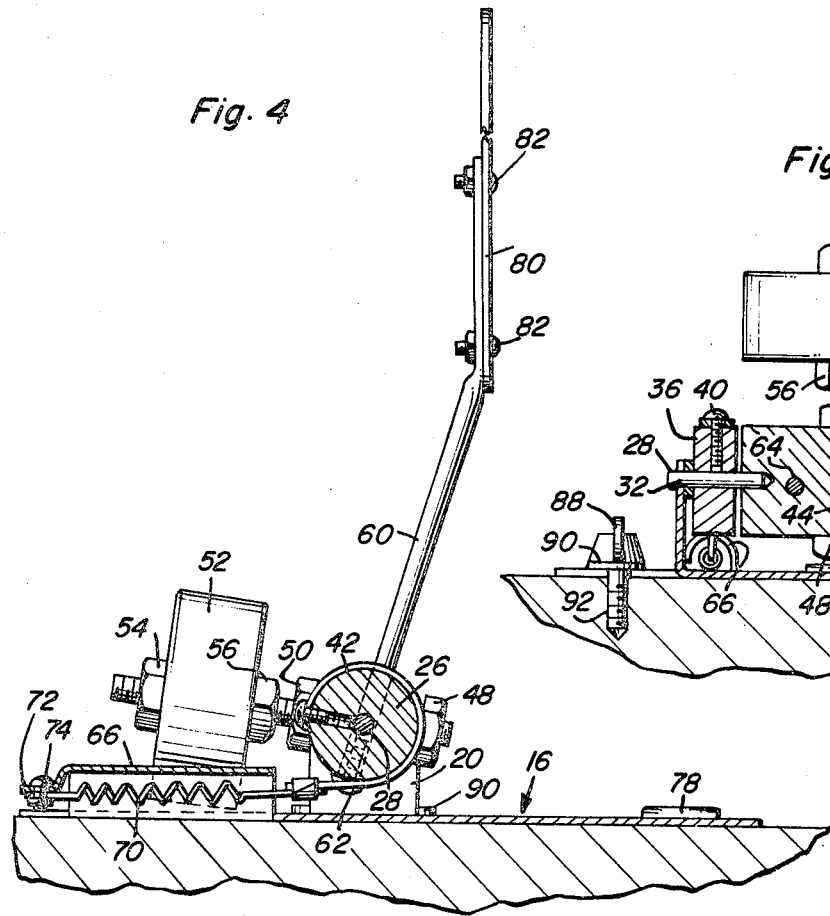
FIGURE 4 is a sectional view similar but with the movable components of the signal in their respective positions assumed when the flat portion of the signal is in its raised operative position.
Figure 5:
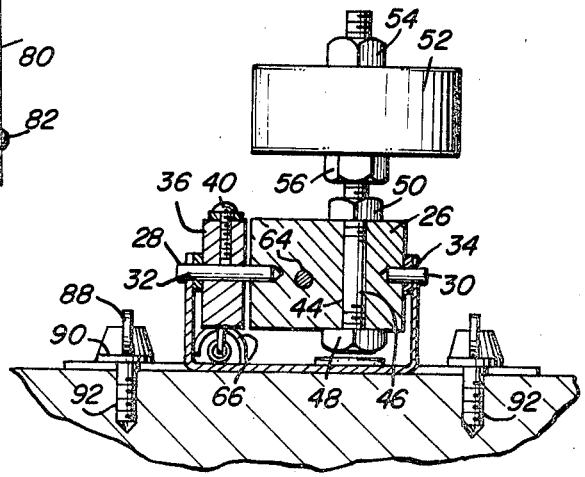
FIGURE 5 is a sectional view taken substantially upon a plane indicated by section line 5—5 of FIGURE 3.

Referring now more specifically to the drawings the numeral 10 generally designates a conventional form of passenger vehicle including a rear window assembly referred to in general by the reference numeral 12 and forwardly of whose lower marginal edge portion a rear shelf 14 is disposed.

The warning signal is generally designated by the reference numeral 16 and includes a generally planar base plate referred to in general by the reference numeral 16. The plate 16 includes a pair of upwardly struck mounting lugs 18 and 20 defining notches 22 and 24 in opposite side marginal edge portions of the plate 16 and a generally cylindrical oscillatable body 26 is disposed between the mounting lugs 18 and 20 and provided with opposite end outwardly projecting stub axles 28 and 30 rotatably journalled in suitable apertures 32 and 34 formed in the mounting lugs 18 and 20, respectively. A winding member disk 36 is disposed on the stub axle 28 between the mounting lug 18 and the adjacent end of the body 26 and is held in adjusted rotated position on the stub axle 28 by means of a radial setscrew 40. The setscrew 40 is also utilized to secure one end of an elongated flexible pull member 42 to the winding member disk 36 for a purpose to be hereinafter more fully set forth.

The end of the body 26 adjacent the mounting lug 20 is provided with a diametric bore 44 through which an externally threaded shank portion or arm member 46 is secured by means of nuts 48 and 50 threaded on the arm member 46 and bearing against diametric opposite portions of the outer surface of the body 26. The end of the arm member 46 which passes through the nut 50 is extended and has a centrally apertured disk-shaped weight 52 mounted thereon in adjusted position therealong by means of a pair of jam nuts 54 and 56 threaded on the arm member 46.

The body 26 includes a second diametric bore 58 formed therethrough intermediate the bore 44 and the end of the body 26 adjacent the disk 36 and one end of an elongated arm 60 is secured in the diametric bore 58 by means of a headed fastener 62 threaded into a threaded blind bore formed in the terminal end of the arm 60 disposed in the bore 58.

The bore 58 includes a counterbore 64 in which the end of the arm 60 supported from the body 26 is seated and in this manner the headed fastener 62 tightly retains the adjacent end of the arm 60 in the inner end of the counterbore 64.

A half cylindrical shroud 66 is formed from a laterally struck portion of the plate 16 and opens downwardly toward the plate 16 so as to substantially enclose an expansion spring 70 disposed within the shroud 66. The shroud 66 includes an apertured mounting lug portion 72 at one end to which one end of the expansion spring 70 is secured by means of a suitable fastener 74 and the other end of the expansion spring 70 is secured to the end of the pull member 42 remote from the setscrew 40.

A resilient bumper pad 76 is secured to the upper surface of the plate 16 for engagement by the weight 52 when the latter is in the position thereof illustrated in FIGURE 4 of the drawings and a second resilient bumper pad 78 is secured to the upper surface of the plate 16 for engagement by the free end portion of the arm 66 when the latter is in the position thereof illustrated in FIGURE 3 of the drawings. The free end of the arm 60 has a "flag" in the form of a panel member 80 secured thereto by means of suitable fasteners 82 and the panel member 80 has suitable indicia 84 thereon. In operation, and assuming the panel member 80 to be in the lowered inactive position illustrated in FIGURES 2 and 3 of the drawings disposed below and forward of the lower marginal edge portion of the window assembly 12 closely above the shelf 14, if the vehicle 10 experiences a sudden deceleration, the weight 52 carried by the upright or member 46 forward toward the position thereof illustrated in FIGURE 4 of the drawings, into contact with the resilient bumper pad 76. This of course will cause oscillation of the body 26 from the position illustrated in FIGURE 3 of the drawings to the position thereof illustrated in FIGURE 4 of the drawings thus causing the free end of the arm 60 to be swung upwardly to the position thereof illustrated in FIGURES 1 and 4 of the drawings. Of course, the expansion spring 70 resists oscillation of the body 26 to the position thereof illustrated in FIGURE 4 of the drawings but the tension of the spring 70 is such that its biasing force is overcome as soon as a deceleration rate above a predetermined minimum is experienced by the vehicle 10.

The predetermined rate of acceleration which will overcome the biasing force of the spring 70 may be varied upon shortening or lengthening the effective length of the pull member by rotatably adjusting the disk 36 on the stub axle 28. In addition, any suitable illumination means could be carried by the panel member 80 and electrically connectible to a suitable source of electrical potential through a rotary switch actuated by oscillation of the body 26 if it was desired to provide such illumination means for the "flag" or panel member 80.

The panel 16 is to be secured to the shelf 14 by means of wing nuts including elongated base portions 90 and threadedly engaged with threaded shank portions 92 secured to the shelf 14. In this manner, only 90° rotation of the wing nuts 88 is required to remove the base panel 16 from the shelf 14 by registry of the elongated bases 90 with the notches 22 and 24 so that the inside of the rear window assembly 12 may be readily cleaned. The elongated base 90 of the wind nuts 88 of course bridge the notches 22 and 24 when the wing nuts 88 are disposed in the positions thereof illustrated in FIGURE 2 of the drawings. If it is desired, the wing nuts 88 could be in the form of bolts in which case the threaded shank portions 92 would be fixed for rotation with the wing nuts 88 and the shank portions 92 would be threadedly engaged in the shelf 94 or secured through the shelf 14 by means of suitable threaded fasteners (not shown).

Figure 6:
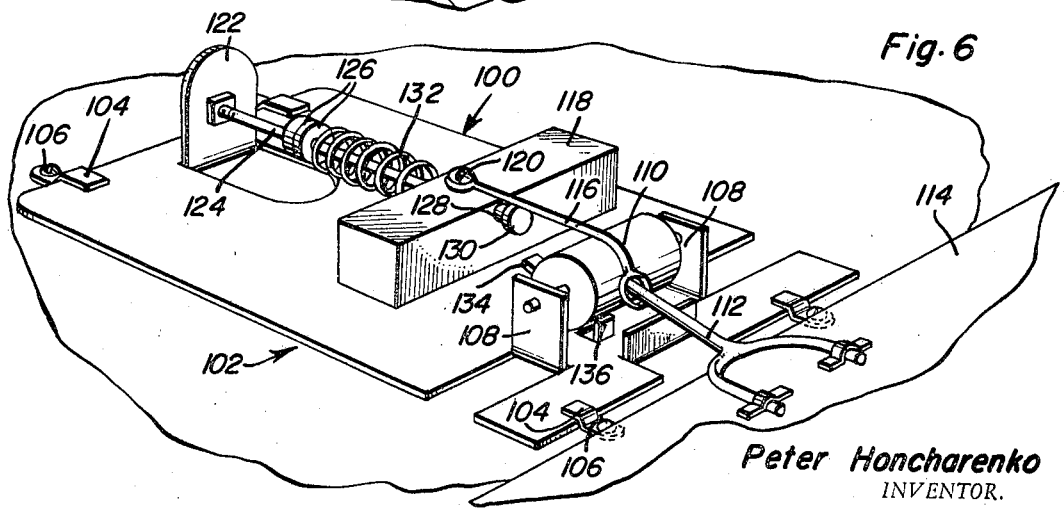
FIGURE 6 is a fragmentary perspective view of a modified form of signal.

With attention now invited more specifically to FIGURE 6 of the drawings there may be seen a modified form of warning signal generally referred to by the reference numeral 100 and which includes a mounting plate generally referred to by the reference numeral 102. The mounting plate 102 is to be secured to the shelf 14 by means of readily releasable and pivotable clips 104 secured to the shelf 14 by means of suitable fasteners 106. The plate 102 includes a pair of laterally upwardly struck mounting lugs 108 similar to the mounting lugs 18 and 20 and between which a body 110 similar to the body 26 is oscillated.

An arm 112 corresponding to the arm 60 is carried by the body 110 and has mounted on its free end a flag or panel member 114 corresponding to the panel member 80. An elongated flexible pull member 116 has one end secured about the end of the arm 112 adjacent the body 110 and the other end of the pull member 116 is secured to a weight 118 by means of a suitable fastener 120.

The end of the plate 102 remote from the mounting lugs 108 is provided with a third upwardly struck mounting lug 122 through which one end of a support rod 124 is secured. The rod 124 is externally threaded and has a pair of jam nuts or stops 126 tightened in predetermined position thereon and the weight 118 is provided with a bore 128 through which the end of the rod 124 remote from the mounting lug 122 is slidably received. The terminal end of the rod 124 remote from the mounting lug 122 includes a diametrically enlarged head 130 and a compression spring 132 is disposed about the rod 124 between the weight 118 and the jam nuts or stops 126. Accordingly, it may be seen that the spring 132 urges the weight 118 toward engagement with the diametrically enlarged head 130 and in a position in which the free end of the arm 112 is allowed to swing to a generally horizontally disposed position. However, upon rapid deceleration of the vehicle in which the signal 100 is disposed, the weight 118 will overcome the biasing force of the spring 132 and slide forwardly thus exerting a pull on the pull member 116 which will in turn cause the arm 112 to swing from the position thereof illustrated in FIGURE 6 of the drawings to a position similar to that in which the arm 60 is disposed in FIGURE 4 of the drawing. Of course, the body 110 includes a radially outwardly projecting abutment 134 diametrically opposite the point of securement of the arm 112 to the body 110 and which is engageable by an upwardly struck stop lug 136 carried by the plate 102. The operation of the embodiment illustrated in FIGURE 6 is of course substantially identical to the operation of the signal illustrated in FIGURES 1–5 of the drawings. Accordingly, each of the disclosed signals is operative to raise its "flag" portion upon deceleration of the associated vehicle above a predetermined rate. In addition, each of the arms 60 and 112 is slightly rearwardly and upwardly inclined when in the raised operative position and therefore serves to assist in swinging the arms 60 and 112 to their inoperative position upon acceleration of the associated vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A sudden stop actuated warning signal assembly for vehicles, said assembly comprising a base supported from a vehicle subject to sudden deceleration along a predetermined path of movement, a signal actuating arm oscillatably secured to said base for swinging movement between active and inactive positions rotated between 45 and 135 degrees apart about an axis extending transversely of said arm, said base being supported from said vehicle with said axis disposed generally normal to said path, spring means operatively connected between said base and said arm yieldingly urging said arm toward said inactive position, and weight means connected to said arm and guidingly supported from said base for oscillation generally in unison with said arm and operative, upon deceleration of movement of said base, in one direction along a path of movement above a predetermined magnitude to oscillate said arm toward said active position, said arm, when in said inactive position, at least generally paralleling said path and, when in said active position extending generally transversely of said path.

2. The combination of claim 1 wherein said weight means is mounted on an arm member extending generally radially of the axis of oscillation of said arm and oscillatable with and disposed at generally right angles relative to said arm.

3. The combination of claim 2 including a body journalled from said base for oscillation between limit positions, said arm and arm member extending generally radially of said oscillatable body.

4. The combination of claim 1 wherein said weight means is mounted on said arm member for adjustable positioning therealong.

5. The combination of claim 1 including a body journalled from said base for oscillation between limit positions, said arm extending generally radially of said body, said body including at least a partial cylindrical portion generally concentric with the axis of oscillation of said body, an elongated flexible tension member having one end portion secured to and at least partially wound about said partial cylindrical portion, means operatively connected to said base and the other end portion of said tension member exerting a yieldable pull on said other end portion.

6. The combination of claim 5 wherein said weight means is supported from said base for reciprocation along a path generally paralleling the first mentioned path toward and away from said body.

7. The combination of claim 1, including a body journalled from said base for oscillation between limit positions, said arm extending generally radially of said body, said body including at least a partial cylindrical portion generally concentric with the axis of oscillation of said body, an elongated flexible tension member having one end portion secured to and at least partially wound about said partial cylindrical portion, means operatively connected to said base and the other end portion of said tension member exerting a yieldable pull on said other end portion, said weight means being carried by an arm member extending generally radially outwardly of said body.

8. The combination of claim 1 wherein said base includes a panel member including laterally struck portions between which said arm is swingably supported.

9. The combination of claim 8 wherein said weight means is mounted on an arm member extending generally radially of the axis of oscillation of said arm and oscillatable with and disposed at generally right angles relative to said arm, a body journalled from said base for oscillation between limit positions, said arm and arm member extending generally radially of said oscillatable body, said body being journalled between said laterally struck portions.

10. The combination of claim 1 wherein said base includes a panel member including laterally struck portions between which said arm is swingably supported, said panel member including means adapting the panel member for readily removable support from the rear shelf portion of a passenger motor vehicle disposed immediately forward of the rear window of said vehicle.

References Cited

UNITED STATES PATENTS

| | | | |
|---|---|---|---|
| 1,187,286 | 6/1916 | Dunsheath | 116—35 |
| 1,624,219 | 4/1927 | Cowdrey | 340—262 |
| 1,875,676 | 9/1932 | Taplin | 116—42 XR |
| 2,880,408 | 3/1959 | Sewell | 116—37 XR |
| 3,141,253 | 7/1964 | Bartram | 40—129 |

LOUIS J. CAPOI, Primary Examiner